United States Patent [19]
Matsunaga

[11] Patent Number: 5,345,274
[45] Date of Patent: Sep. 6, 1994

[54] GHOST CANCELING CIRCUIT PROMPTLY RESPONSIVE TO CHANNEL CHANGE

[75] Inventor: Mitsuhiro Matsunaga, Tokyo, Japan

[73] Assignee: NEC Corporation, Tokyo, Japan

[21] Appl. No.: 183,833

[22] Filed: Jan. 21, 1994

[30] Foreign Application Priority Data

Jan. 25, 1993 [JP] Japan .................................. 5-009641

[51] Int. Cl.⁵ ........................................... H04N 5/213
[52] U.S. Cl. ...................................... 348/614; 348/725
[58] Field of Search ................... 348/614, 731, 725; 358/905, 167; H04N 5/213

[56] References Cited

U.S. PATENT DOCUMENTS

| | | | |
|---|---|---|---|
| 4,897,725 | 1/1990 | Tanaka et al. | 358/167 |
| 4,947,252 | 8/1990 | Kobayashi et al. | 358/167 |
| 4,953,026 | 8/1990 | Kobayashi et al. | 358/167 |

FOREIGN PATENT DOCUMENTS 62-181579 8/1987 Japan .

OTHER PUBLICATIONS

Matsuura, Shigeo; Miyazawa, Hiroshi; Takayama, Susumo; Usui, Masao; Kobayashi, Relichi; and Iga, Hiroyuki. "Development of a Ghost Cancel Technology for TV Broadcasting", *NAB: Engineering Conference Proceedings*. pp. 229–238 (1990).

*Primary Examiner*—James J. Groody
*Assistant Examiner*—Sherrie Hsia
*Attorney, Agent, or Firm*—Whitham, Curtis, Whitham & McGinn

[57] ABSTRACT

Digital ghost eliminating filters incorporated in a ghost canceling circuit are responsive to weighted coefficients for canceling ghost components of a digital video signal assigned to a selected channel for a clear video image, and has an auxiliary receiving circuit sequentially tuned in other channels so as to previously produce sets of weighted coefficients for non-selected channels, thereby immediately supplying one of the sets of weighted coefficients to the digital ghost eliminating filters when a main receiving circuit is tuned in another channel.

5 Claims, 3 Drawing Sheets

GHOST CANCELING CIRCUIT PROMPTLY RESPONSIVE TO CHANNEL CHANGE

FIELD OF THE INVENTION

This invention relates to a ghost canceling circuit and, more particularly, to a ghost canceling circuit for rejecting a ghost image due to reflected waves from a television screen.

DESCRIPTION OF THE RELATED ART

While a television signal is being propagated from a broadcaster to a television receiver, a mountain, buildings and flying airplane reflect the television signal, and, accordingly, introduce time delay between the reflected waves and the direct wave, because the reflected waves travel slightly prolonged paths. In other words, the television signal travels a multipath until the television receiver, and the reflected waves produce a ghost image horizontally deviated from a regular image reproduced from the direct wave on the television screen. The reflected waves are weaker than the direct wave, and the ghost image is faint rather than the regular image. The ghost image deteriorates the image reproduced on the television screen, and various ghost canceling circuits are proposed against the ghost trouble.

One of the prior art ghost canceling circuits is disclosed in U.S. Pat. No. 4,953,026, and a transversal filter and a variable time delay circuit form the ghost canceling circuit. The time delay and the gains at the taps of the transversal filter are controlled in such a manner as to produce anti-ghost waves inverted in waveform to the ghost waves. The anti-ghost waves are superimposed with the received image signal, and cancels the ghost components due to the reflected waves.

Other prior art ghost canceling circuits are disclosed in U.S. Pat. No. 4,897,725, U.S. Pat. No. 4,947,252, Japanese Publication of Unexamined Application (Kokai) No. 62-181579 and "DEVELOPMENT OF A GHOST CANCEL TECHNOLOGY FOR TV BROADCASTING", 1990 NAB Engineering Conference PROCEEDINGS, pages 229 to 238. The ghost canceling circuits disclosed therein treat NTSC signals superimposed with ghost canceling reference signals (abbreviated as "GCR" hereinbelow) during vertical blanking periods of the received television signals.

A typical example of these ghost canceling circuits disclosed in U.S. Pat. No. 4,897,725 firstly treats a difference of the actual waveform of the GCR signal and a difference of a standard waveform of the GCR signal with a Fourier transform, and the time delay and the gains at the taps are, thereafter, determined through the inverse Fourier transformation.

In detail, a broadcaster superimposes the GCR signal with the NTSC signal in the vertical blanking periods, and broadcasts the NTSC signal superimposed with the GCR signal. When the NTSC signal superimposed with the GCR signal arrives at a television receiver, a multireflection affects not only the NTSC signal but also the GCR signal superimposed therewith, and the television receiver extracts the GCR signal affected by the multireflection. The ghost canceling circuit incorporated in the television receiver analyzes the characteristics of the ghost due to the multireflection on the basis of turbulence of the waveform of the received signal.

The Fourier transform is applied to two objects. The first object is the difference between an extracted GCR signal and a delayed extracted GCR signal sampled at the previous timing. The second object is the difference between a standard GCR signal and a delayed standard GCR signal sampled at the previous timing. However, an extracted GCR signal and a standard GCR signal are treated with the Fourier transform for the NTSC signal superimposed with the GCR signal in the U.S.A., and the extracted GCR signal and the standard GCR signal are the two objects. If the ghost canceler stores a set of data codes produced through the Fourier transformation on the difference between the standard GCR signal and the delayed standard GCR signal or on the standard GCR signal, the second Fourier transformations are not carried out.

Typical examples of the analysis are disclosed in U.S. Pat. No. 4,947,252 and in the 1990 NAB Engineering Conference PROCEEDINGS. The ghost canceling circuit calculates the difference between the waveform of the extracted GCR signal and the waveform of the standard GCR signal superimposed by the broadcaster, and treats the difference with the Fourier transformation. The output of the Fourier transformer is treated with the inverse Fourier transformation, and the output of the inverse Fourier transformer controls the time delay and the gain at the taps of the ghost canceling filter. The ghost canceling filter thus controlled provides appropriate filtering characteristics against the ghost components. Namely, while the received signal is passing through the ghost canceling filter, the ghost canceling filter decreases the amplitude of the ghost components to zero, and eliminates the ghost components from the received NTSC signal.

As disclosed in U.S. Pat. No. 4,947,252, the ghost canceling filter has a near-by ghost eliminating section implemented by a non-recursive type filter against near-by ghost components and a distant ghost eliminating section implemented by a recursive type filter against other ghost components. As well known to a person skilled in the art, these filters are of a digital filter having adders, multipliers accompanied with coefficient sources and time delay elements each operative to introduce unit time delay, and the non-recursive type filter is called as the transversal filter.

FIG. 1 illustrates a ghost elimination circuit 1, and the ghost elimination circuit 1 is connected with an antenna 2 through a receiving circuit 3, and television signals are firstly transferred to the receiving circuit 3. The receiving circuit 3 is tunable with one of the available channels, and selects one of the analog television signals. The base-band television signal or an analog video signal S is supplied in parallel to an analog-to-digital converter 1b (abbreviated as "ADC" in FIG. 1) and a controller 1c, and the analog-to-digital converter 1b produces a digital video signal DS from the analog video signal S.

The digital video signal DS is supplied to the controller 1c, and the controller 1c produces a first weighted coefficient signal SN for a near-by ghost eliminating filter 1d and a second weighted coefficient signal SF for a distant ghost eliminating filter 1e.

The digital video signal DS sequentially passes through the near-by ghost eliminating filter 1d and the distant ghost eliminating filter 1e, and these filters 1d and 1e cancel ghost components from the digital video signal DS under the controller 1c. The digital video signal DS' without ghost components is supplied to a digital-to-analog converter 1f, and the digital-to-analog converter If reproduces an analog video signal S' without ghost components.

FIG. 2 illustrates the circuit arrangement of the controller 1c. The digital video signal DS is input to a GCR detecting circuit 1g, and the GCR detecting circuit 1g extracts the GCR components equivalent to the GCR signal from the digital video signal DS. The extracted GCR components contain ghost components indicative of a ghost image, and are compared with standard GCR components indicative of the original GCR signal without ghost components. The standard GCR components are stored in the GCR detecting circuit 1g. The extracted GCR components are subjected to a Fourier transformation. The GCR detecting circuit 1g further treats the result of the Fourier transformation with a high-frequency compensation for preventing from the beat fault as similar to that described in U.S. Pat. No. 4,897,725. Finally, the GCR detecting circuit 1g finally produces a ghost status signal GS through the inverse Fourier transformation.

The ghost status signal GS is supplied to a first coefficient generator 1h and to a second coefficient generator 1i, and the first and second coefficient generators 1h and 1i produce first and second weighted coefficients N and F for the near-by ghost eliminating filter 1d and the distant ghost eliminating filter 1e. The first and second weighted coefficients N and F are supplied to a transfer circuit 1j, and the transfer circuit 1j supplies the first weighted coefficient signal SN and the second weighted coefficient signal SF respectively indicative of the first weighted coefficient N and the second weighted coefficient F to the near-by ghost eliminating filter 1d and to the distant ghost eliminating filter 1e.

FIG. 3 illustrates the near-by ghost eliminating filter 1d, and comprises a delay circuit 1k and a transversal filter 1m. The digital video signal DS is supplied to the transversal filter 1m, and is weighted by the first weighted coefficient signal SN. The weighted values are indicative of anti-ghost components against the ghost components indicative of the near-by ghost, and are equal in magnitude and opposite in polarity to the ghost components. The weighted values are supplied to an adder 1n, and the adder 1n is incorporated in the near-by ghost eliminating filter 1d. The transversal filter 1m is of an FIR filter, and the adder In allows the transversal filter 1m to serve as an IIR filter. The digital video signal DS is further supplied through the delay circuit 1k to the adder 1n. The adder In adds the weighted values indicative of the anti-ghost components to the delayed digital video signal, and eliminates the near-by ghost components from the digital video signal DS.

FIG. 4 illustrates the distant ghost eliminating filter 1e, and the distant ghost eliminating filter 1e comprises an adder 1o and a transversal filter 1p. The adder 1o and the transversal filter 1p form a feedback loop, and the near-by ghost filter 1e supplies the digital video signal DS to the adder 1o. The digital video signal DS is weighted by the second weighted coefficient signal DF, and an adder 1q of the transversal filter 1p produces the sum indicative of anti-ghost components against the ghost components indicative of the distant ghost. The adder 1q feeds back the sum indicative of the anti-ghost components from the output node CF to the adder 1o. The adder 1o adds the sum to the value of the digital video signal DS supplied from the near-by ghost eliminating filter 1d, and cancels the ghost components indicative of the distant ghost. Thus, the feedback loop sequentially produces the digital video signal DS' without the ghost components.

The ghost canceling circuit 1 thus arranged is a compromise between the ghost canceling filter shown in FIG. 5 of U.S. Pat. No. 4,953,026 and the tap-gain controlling circuit shown in FIG. 1 of U.S. Pat. No. 4,897,725, and no further description is made on the detailed circuit arrangement of the near-by ghost filter 1d, the detailed circuit arrangement of the distant ghost eliminating filter 1e and the detailed circuit arrangement of the controller 1c for the sake of simplicity.

The ghost canceling circuit 1 encounters a problem in that the ghost canceling operation is delayed after a change of the channel at the receiving circuit 3.

SUMMARY OF THE INVENTION

It is therefore an important object of the present invention to provide a ghost canceling circuit which promptly starts the ghost canceling operation upon change of a channel.

To accomplish the object, the present invention proposes to previously store sets of weighted coefficients for non-selected channels.

In accordance with the present invention, there is provided a ghost canceling circuit associated with a main receiving circuit for eliminating a ghost image from a video image on a screen, the main receiving circuit being tuned in one of channels assigned to one of broadcasting signals supplied from an antenna for producing a main analog video signal, each of the broadcasting signals containing a ghost canceling reference component, the ghost canceling circuit entering through a transition period into a stable period when the main receiving circuit is tuned in another channel, and comprising: a) a main analog-to-digital converting circuit for converting the main analog video signal to a main digital video signal; b) a ghost component canceling means coupled with the main analog-to-digital converting circuit, and responsive to a weighted coefficient signal indicative of weighted coefficients for canceling ghost components indicative of the ghost image from the main digital video signal; c) a digital-to-analog converting circuit coupled with the ghost component canceling means, and converting the main digital video signal without the ghost components into an analog video signal without ghost components; d) an auxiliary receiving circuit electrically coupled with the antenna, and sequentially tuned in others of the channels respectively assigned to others of the broadcasting signals for producing an auxiliary analog video signal from one of the others of the broadcasting signals; e) an auxiliary analog-to-digital converting circuit coupled with the auxiliary receiving circuit, and converting the auxiliary analog video signal into an auxiliary digital video signal; and f) a controlling circuit having f-1) a channel controller sequentially selecting the others of the channels for the auxiliary receiving circuit, and tuning the auxiliary receiving circuit with a presently selected channel, f-2) a coefficient producing means for producing the weighted coefficients from a combination of the main analog video signal, the main digital video signal and a standard ghost canceling reference component without an influence of reflected waves of each broadcasting signal or from a combination of the auxiliary analog video signal, the auxiliary digital video signal and the standard ghost canceling reference component, f-3) a memory circuit for storing a plurality sets of weighted coefficients for the others of the broadcasting signals, each of the plurality sets of weighted coefficients being produced from the combination of the auxiliary analog video signal, the auxiliary digital video signal and the standard ghost canceling reference component, f-4) a transfer circuit having a first port for transferring the weighted coefficients produced from the combination of the auxiliary analog video signal, the auxiliary digital video signal and the standard ghost canceling reference component from the coefficient producing means to the memory circuit, and a second port for continuously supplying the weighted coefficient signal indicative of the weighted coefficients produced from the combination of the main analog video signal, the main digital video signal and the standard ghost canceling reference component to the ghost component canceling means, the transfer circuit temporally supplying one of the plurality sets of weighted coefficients read out from the memory circuit from the second port to the ghost component canceling means in the transition period after the main receiving circuit is tuned with another channel.

BRIEF DESCRIPTION OF THE DRAWINGS

The feature and advantages of the ghost canceling circuit according to the present invention will be more clearly understood from the following description taken in conjunction with the accompanying drawings in which.

DESCRIPTION OF THE PREFERRED EMBODIMENT

Figure 1:
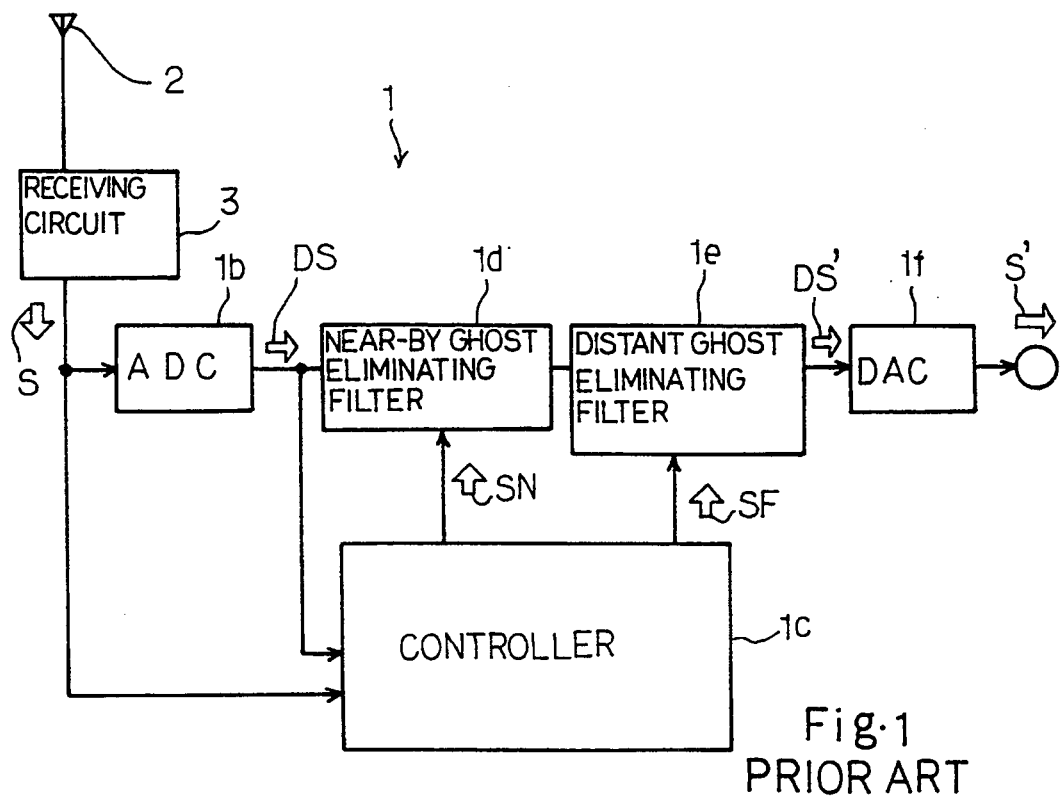
FIG. 1 is a block diagram showing the circuit arrangement of the prior art ghost canceling circuit.
Figure 2:
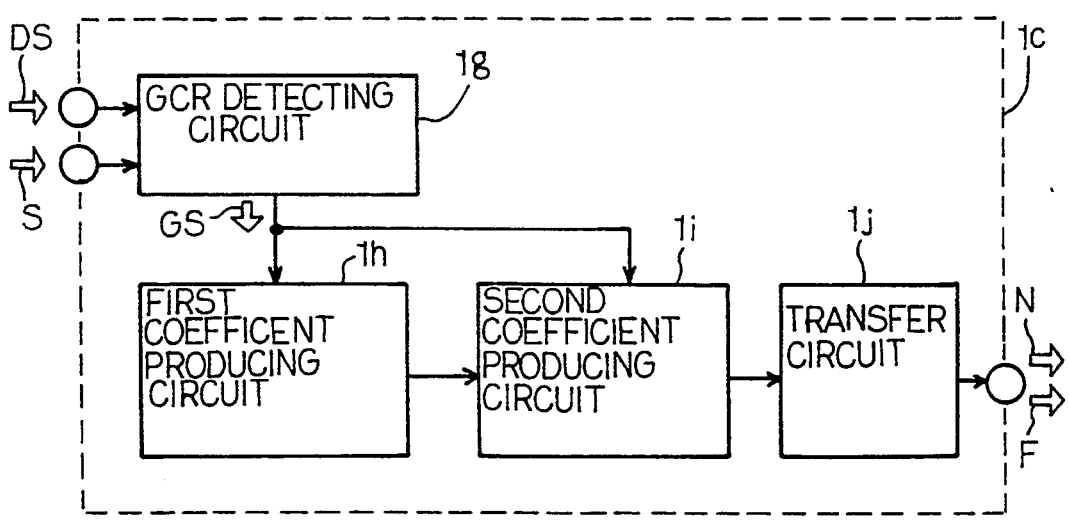
FIG. 2 is a block diagram showing the circuit arrangement of the controller incorporated in the prior art ghost canceling circuit.
Figure 3:
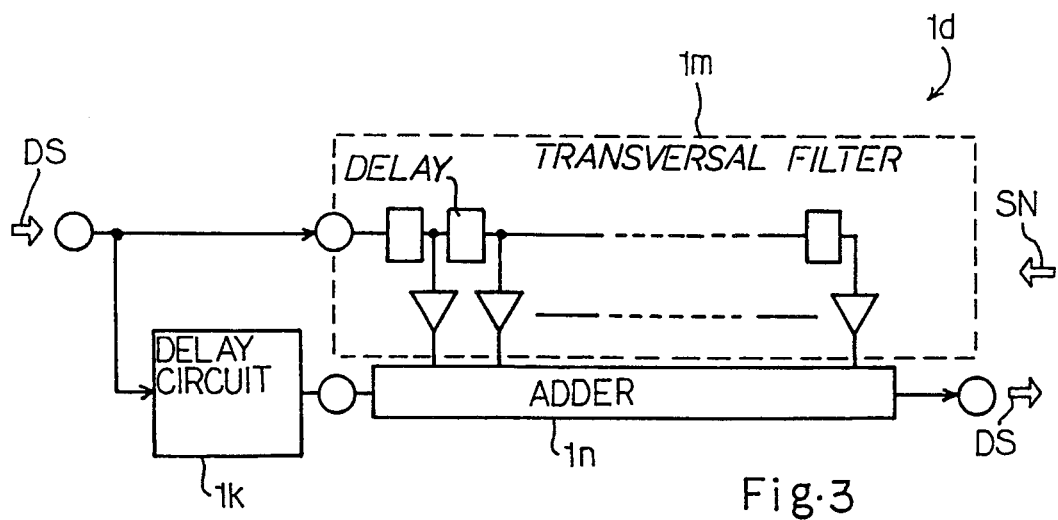
FIG. 3 is a block diagram showing the circuit arrangement of the near-by ghost eliminating filter incorporated in the prior art ghost canceling circuit.
Figure 4:
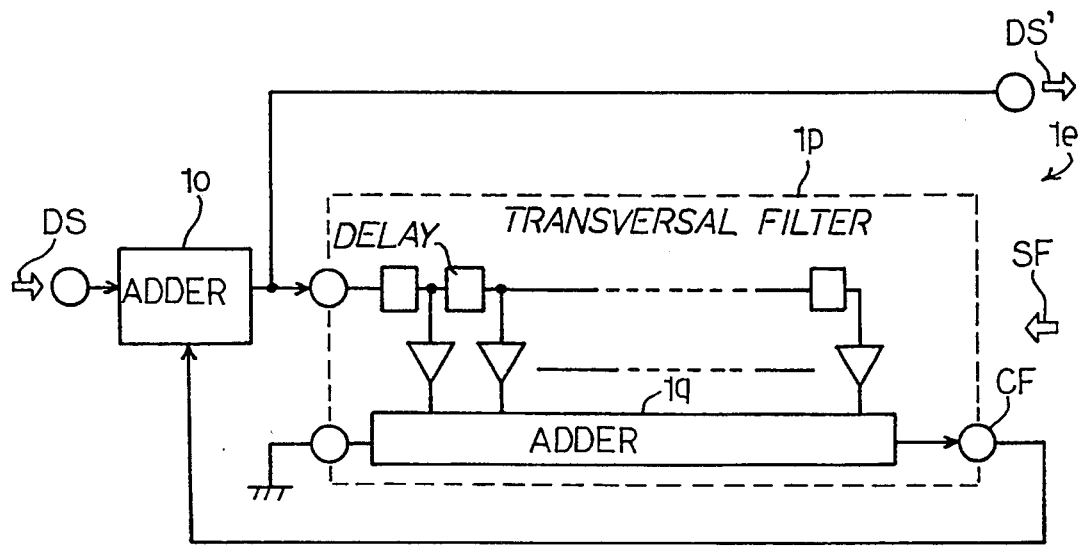
FIG. 4 is a block diagram showing the circuit arrangement of the distant ghost eliminating filter incorporated in the prior art ghost canceling circuit.
Figure 5:
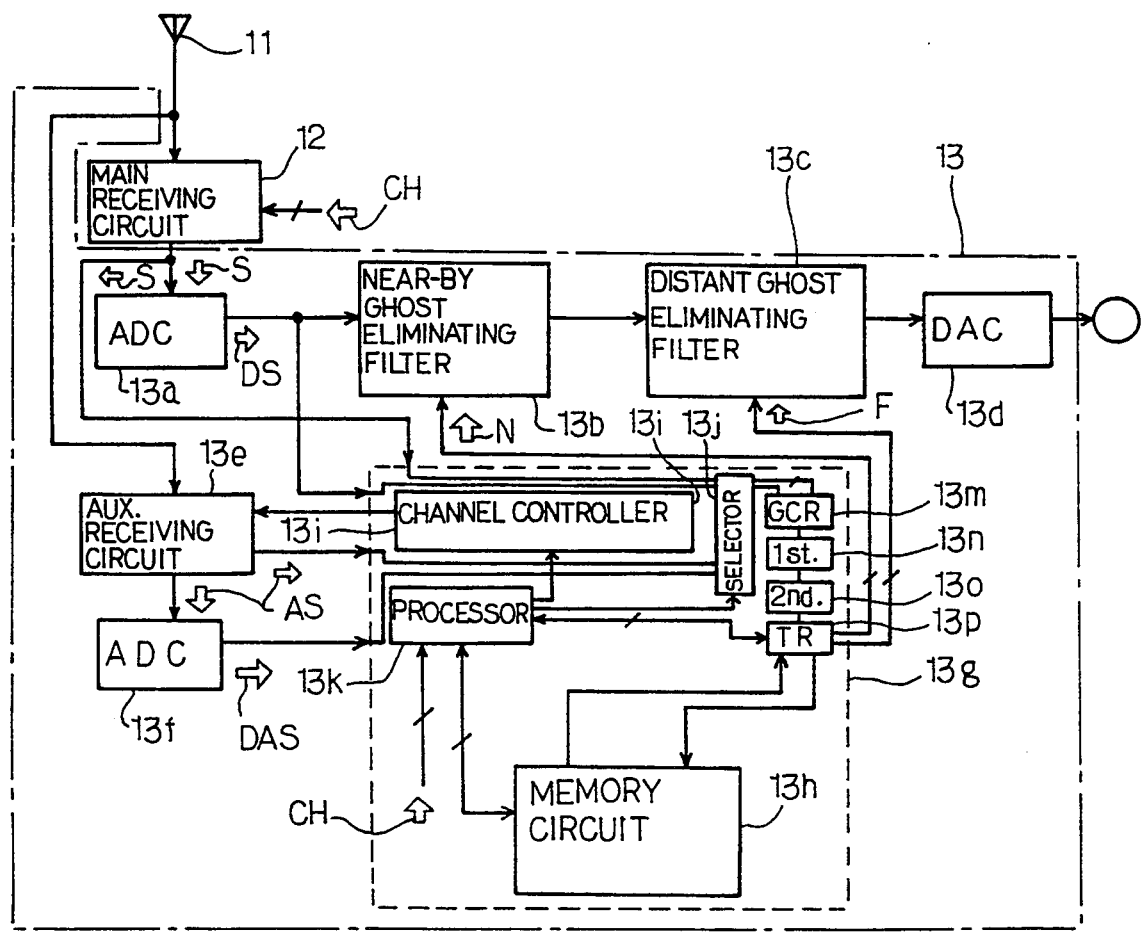
FIG. 5 is a block diagram showing the circuit arrangement of a ghost canceling circuit according to the present invention.

Referring to FIG. 5 of the present invention, an antenna 11 catches various television signals, and transfers the television signals in parallel to a main receiving circuit 12 and a ghost canceling circuit 13. The main receiving circuit 12 is tunable with one of the channels respectively assigned to the television signals, and transfers one of the television signals to the ghost canceling circuit 13. The television signals are broadcasted from a television station, and each of the television signals has a ghost canceling reference component inserted into an NTSC signal.

The ghost canceling circuit comprises an analog-to-digital converting circuit 13a abbreviated as "ADC", a near-by ghost eliminating filter 13b, a distant ghost eliminating filter 13c and a digital-to-analog converting circuit 13d abbreviated as "DAC". The analog-to-digital converting circuit 13a, the near-by ghost eliminating filter 13b, the distant ghost eliminating filter 13c and the digital-to-analog converting circuit 13d are similar to those of the prior art ghost canceling circuit 1. The main receiving circuit 12 is responsive to a channel selecting signal CH supplied from a channel switch unit (not shown), and the main receiving circuit 12 is tuned in a channel indicated by the channel selecting signal CH. The main receiving circuit 12 selects one of the television signals assigned the selected channel, and produces a main analog video signal from the selected television signal. The analog-to-digital converting circuit 13a produces a main digital video signal DS from the main analog video signal, and the main digital video signal DS supplies the main digital video signal DS to the near-by ghost eliminating filter 13b. The near-by ghost eliminating filter 13b and the distant ghost eliminating filter 13c cancel ghost components indicative of a near-by ghost and a distant ghost incorporated in a digital video signal DS as similar to the prior art near-by ghost eliminating filter 1d and the distant ghost eliminating filter 1e. In this instance, the near-by ghost eliminating filter 13b and the distant ghost eliminating filter 13c as a whole constitute a ghost component canceling means.

The ghost canceling circuit 13 further comprises an auxiliary receiving circuit 13e, an auxiliary analog-to-digital converting circuit 13f, a controlling circuit 13g and a memory 13h. The auxiliary receiving circuit 13e is directly coupled with the antenna 11, and is tuned in a channel by a channel controller 13i incorporated in the controlling circuit 13g. The channel controller 13i sequentially selects different channels from the channel with which the main receiving circuit 12 is tuned. For example, if the first to tenth channels are provided for the television signals and the main receiving circuit 12 is presently tuned in the first channel, the channel controller 13i sequentially tune the auxiliary receiving circuit 13e with the second channel to the tenth channel. The auxiliary receiving circuit 13e produces an auxiliary analog video signal AS from the television signal assigned to the selected channel.

The auxiliary analog video signal AS is transferred in parallel from the auxiliary receiving circuit 13e to a selector 13j of the controlling circuit 13g and to the auxiliary analog-to-digital converting circuit 13f, and the auxiliary analog-to-digital converting circuit 13f produces an auxiliary digital video signal DAS. The auxiliary digital video signal DAS is supplied from the auxiliary analog-to-digital converting circuit 13f to the selector 13j of the controlling circuit 13g. The main analog video signal S and the main digital video signal DS are also supplied to the selector 13j, and the selector 13j is transparent to either main analog video signal/main digital video signal or auxiliary video signal/auxiliary video signal under the control of a processor 13k. The processor 13k is responsive to the channel selecting signal CH, and achieves various jobs as will be described hereinlater in detail.

The controlling circuit 13g further comprises a GCR detecting circuit 13m, a first coefficient producing circuit 13n, a second coefficient producing circuit 13o and a transfer circuit 13p. The GCR detecting circuit 13m, the first coefficient producing circuit 13n and the second coefficient producing circuit 13o are similar to those 1g, 1h and 1i of the prior art controller 1c, and, for this reason, are not described in detail. In this instance, the GCR detecting circuit 13m, the first coefficient producing circuit 13n and the second coefficient producing circuit 13o as a whole constitute a coefficient producing means.

The transfer circuit 13p has two output ports one of which is coupled with the near-by ghost eliminating filter 13b and the distant ghost eliminating filter 13c as similar to the transfer circuit 1j and the other of which is coupled with the memory circuit 13h. The transfer circuit 13p is communicable with the memory circuit 13h under the control of the processor 13k while supplying the first and second weighted coefficient signals N and F to the near-by ghost eliminating filter 13b and the distant ghost eliminating filter 13c.

The processor 13k executes a program sequence, and achieves various jobs for the channel controller 13i, the selector 13j, the transfer circuit 13p and the memory circuit 13h as follows.

Assuming now that available television signals are respectively assigned to the first to tenth channels and that the main receiving circuit 12 is presently tuned in the first channel, the main analog-to-digital converting circuit 13a supplies the main digital video signal DS in parallel to the near-by ghost eliminating filter 13b and the selector 13j, and the processor 13k instructs the selector 13j to transfers the main analog video signal S and the main digital video signal DS to the GCR detecting circuit 13m. The GCR detecting circuit 13m, the first coefficient producing circuit 13n and the second coefficient producing circuit 13o behave as similar to those of the prior art ghost canceling circuit 1, and produce main weighed coefficients. The main weighed coefficients are supplied to the transfer circuit 13p, and the transfer circuit 13p produces weighted coefficient signals N and F for the near-by ghost eliminating filter 13b and the distant ghost eliminating filter 13c. The weighted coefficient signals N and F as a whole serve as a weighted coefficient signal.

The transfer circuit 13p latches the weighted coefficient signals N and F at the first port, and continuously supplies the weighted coefficient signals N and F to the near-by ghost eliminating filter 13b and the distant ghost eliminating filter 13c.

When the first port starts to supply the weighted coefficient signals N and F indicative of the main weighted coefficients to the near-by ghost eliminating filter 13b ad the distant ghost eliminating filter 13c, the transfer circuit 13p reports the latch of the weighted coefficient signals N and F to the processor 13k, and the processor instructs the channel controller 13i to sequentially tune the auxiliary receiving circuit 13e with the second to tenth channels. The processor 13k further instructs the selector 13j to become transparent to the auxiliary analog video signal and the auxiliary digital video signal.

The channel controller 13i firstly tunes the auxiliary receiving circuit 13e to the second channel, and the auxiliary receiving circuit 13e produces the auxiliary analog video signal AS from one of the non-selected television signal assigned to the second channel. The auxiliary analog-to-digital converting circuit 13f converts the auxiliary analog video signal into the auxiliary digital video signal DAS, and the selector 13j transfers the auxiliary analog video signal and the auxiliary digital video signal to the GCR detecting circuit 13m. The GCR detecting circuit 13m, the first coefficient producing circuit 13n ad the second coefficient producing circuit 13o cooperates, and produces a set of weighted coefficients for the non-selected television signal assigned to the second channel.

Upon production of the set of weighted coefficients, the processor 13k instructs the transfer circuit 13p to transfer it from the second port to the memory circuit 13h, and supplies an address signal to the memory circuit 13h for storing the set of weighted coefficients in the selected address.

The processor 13k instructs the channel controller 13i to tune the auxiliary receiving circuit 13e to the third channel, and keeps the selector 13j transparent to the auxiliary analog video signal AS and the auxiliary digital video signal DAS. The GCR detecting circuit 13m, the first coefficient producing circuit 13n and the second coefficient producing circuit 13o produces another set of weighted coefficients for the non-selected television signal assigned to the third channel. The sets of weighted coefficients are also memorized in the memory circuit 13h.

Thus, the processor 13k instructs the channel controller 13i to sequentially tune the auxiliary receiving circuit 13e with the non-selected third to tenth channels, and a plurality sets of weighted coefficients are memorized in the memory circuit 13h.

While the GCR detecting circuit 13m, the first coefficient producing circuit 13n ad the second coefficient producing circuit 13o are producing the plurality sets of weighted coefficients, the transfer circuit 13p continuously supplies the weighted coefficient signals N and F to the near-by ghost eliminating filter 13b ad the distant ghost eliminating filter 13c. Therefore, the ghost components of the main digital video signal are canceled by the near-by ghost eliminating filter 13b and the distant ghost eliminating filter 13c without interruption.

While the main receiving circuit 12 is being tuned in the first channel, the processor 13k repeats the above described sequence, and sets of weighted coefficients for the non-selected channels are available at all times.

If the channel selecting signal CH tunes the main receiving circuit 12 to the second channel, the ghost canceling circuit 13 enters into a transition period, and behaves as follows.

The main receiving circuit 12 produces the main analog video signal S from the newly selected television signal assigned to the second channel, and the main analog-to-digital converting circuit 13a converts the main analog video signal S into the main digital video signal DS. The main digital video signal DS is supplied to the near-by ghost eliminating filter 13b, and the main analog video signal S and the main digital video signal DS are further supplied to the selector 13j.

When the processor 13k notices that the channel selecting signal CH tunes the main receiving circuit 12 from the first channel to the second channel, the processor 13k shifts the selector 13j to the main analog video signal S and the main digital video signal DS. Moreover, the processor 13k supplies the address signal to the memory circuit 13h, and instructs the memory circuit 13h to transfer the set of weighted coefficient for the television signal assigned to the second channel to the transfer circuit 13p. The transfer circuit 13p latches the set of weighted coefficients, and produces the weighted coefficient signals N and F from the sets of weighted coefficients. For this reason, the near-by ghost eliminating filter 13b and the distant ghost eliminating filter 13c immediately cancel the ghost components of the main digital video signal DS by using the appropriate weighted coefficients N and F.

The main analog video signal S and the main digital video signal DS pass through the selector 13j, and the GCR detecting circuit 13m, the first coefficient producing circuit 13n ad the second coefficient producing circuit 13o produce weighted coefficients for the newly selected television signal. When the weighted coefficients for the newly selected television signal reach the transfer circuit 13p, the transfer circuit 13p produces the weighted coefficient signals N and F from the newly produced weighted coefficients, and the ghost canceling circuit 13 enters into a stable period.

As will be appreciated from the foregoing description, the near-by ghost eliminating filter and the distant ghost eliminating filter cancels the ghost components of the newly selected digital video signal by using the appropriate weighted coefficients, and a clear video image is reproduced on a screen in the transition period.

Although particular embodiments of the present invention have been shown and described, it will be obvious to those skilled in the art that various changes and modifications may be made without departing from the spirit and scope of the present invention. For example, various near-by ghost eliminating filter and/or various distant ghost eliminating filters may be available for the ghost component canceling means.

What is claimed is:

1. A ghost canceling circuit associated with a main receiving circuit for eliminating a ghost image from a video image on a screen, said main receiving circuit being tuned in one of channels assigned to one of broadcasting signals supplied from an antenna for producing a main analog video signal, each of said broadcasting signals containing a ghost canceling reference component, said ghost canceling circuit entering through a transition period into a stable period when said main receiving circuit is tuned in another channel, and comprising:

a) a main analog-to-digital converting circuit for converting said main analog video signal to a main digital video signal;

b) a ghost component canceling means coupled with said main analog-to-digital converting circuit, and responsive to a weighted coefficient signal indicative of weighted coefficients for canceling ghost components indicative of said ghost image from said main digital video signal;

c) a digital-to-analog converting circuit coupled with said ghost component canceling means, and converting said main digital video signal without said ghost components into an analog video signal without ghost components;

d) an auxiliary receiving circuit electrically coupled with said antenna, and sequentially tuned in others of said channels respectively assigned to others of said broadcasting signals for producing an auxiliary analog video signal from one of said others of said broadcasting signals;

e) an auxiliary analog-to-digital converting circuit coupled with said auxiliary receiving circuit, and converting said auxiliary analog video signal into an auxiliary digital video signal; and f) a controlling circuit having f-1) a channel controller sequentially selecting said others of said channels for said auxiliary receiving circuit, and tuning said auxiliary receiving circuit with a presently selected channel, f-2) a coefficient producing means for producing said weighted coefficients from a combination of said main analog video signal, said main digital video signal and a standard ghost canceling reference component without an influence of reflected waves of each broadcasting signal or from a combination of said auxiliary analog video signal, said auxiliary digital video signal and said standard ghost canceling reference component, f-3) a memory circuit for storing a plurality sets of weighted coefficients for said others of said broadcasting signals, each of said plurality sets of weighted coefficients being produced from said combination of said auxiliary analog video signal, said auxiliary digital video signal and said standard ghost canceling reference component, and f-4) a transfer circuit having a first port for transferring said weighted coefficients produced from said combination of said auxiliary analog video signal, said auxiliary digital video signal and said standard ghost canceling reference component from said coefficient producing means to said memory circuit, and a second port for continuously supplying said weighted coefficient signal indicative of said weighted coefficients produced from said combination of said main analog video signal, said main digital video signal and said standard ghost canceling reference component to said ghost component canceling means, said transfer circuit temporally supplying one of said plurality sets of weighted coefficients read out from said memory circuit from said second port to said ghost component canceling means in said transition period after said main receiving circuit is tuned with another channel.

2. The ghost canceling circuit as set forth in claim 1, in which said ghost component canceling means comprises a near-by ghost eliminating filter for canceling the ghost components indicative of near-by ghost sub-images, and a distant ghost eliminating filter for canceling the ghost components indicative of other ghost sub-images.

3. The ghost canceling circuit as set forth in claim 2, in which said near-by ghost eliminating filter comprises
   a delay circuit operative to retard said main digital video signal for producing a delayed main digital video signal, and
   a transversal filter operative to weight said main digital video signal with coefficients selected from said weighted coefficients from said coefficient producing means for producing weighted signals and to add said weighted signals to said delayed main digital video signal for eliminating said ghost components.

4. The ghost eliminating circuit as set forth in claim 2, in which said coefficient producing means comprises
   a ghost canceling reference detecting circuit supplied with said main analog video signal and said main digital video signal or with said auxiliary analog video signal and said auxiliary digital video signal, and operative to produce a ghost status signal from a difference between an extracted ghost canceling reference component contained in said main digital video signal or in said auxiliary digital video signal and said standard ghost canceling reference component through a Fourier transformation,
   a first coefficient producing circuit responsive to said ghost status signal, and producing a part of said weighted coefficients for said near-by ghost eliminating filter, and
   a second coefficient producing circuit responsive to said ghost status signal, and producing another part of said weighed coefficients for said distant ghost eliminating filter.

5. A ghost canceling circuit associated with a main receiving circuit for eliminating a ghost image from a video image on a screen, said main receiving circuit being tuned in one of channels assigned to one of broadcasting signals supplied from an antenna in response to a channel selecting signal for producing a main analog video signal, each of said broadcasting signals containing a ghost canceling reference component, said ghost canceling circuit entering through a transition period into a stable period when said channel selecting signal tunes said main receiving circuit in another channel, and comprising:

a) a main analog-to-digital converting circuit for converting said main analog video signal to a main digital video signal;

b) a ghost component canceling means coupled with said main analog-to-digital converting circuit, and responsive to a weighted coefficient signal indicative of weighted coefficients for canceling ghost components indicative of said ghost image from said main digital video signal;

c) a digital-to-analog converting circuit coupled with said ghost component canceling means, and converting said main digital video signal without said ghost components into an analog video signal without ghost components;

d) an auxiliary receiving circuit electrically coupled with said antenna, and responsive to an auxiliary channel selecting signal so as to be sequentially tuned in others of said channels respectively assigned to others of said broadcasting signals for producing an auxiliary analog video signal from one of said others of said broadcasting signals;

e) an auxiliary analog-to-digital converting circuit coupled with said auxiliary receiving circuit, and converting said auxiliary analog video signal into an auxiliary digital video signal; and f) a controlling circuit having f-1) a channel controller operative to supply said auxiliary channel selecting signal to said auxiliary receiving circuit for tuning said auxiliary receiving circuit with a presently selected channel, f-2) a coefficient producing means for producing said weighted coefficients from a combination of said main analog video signal, said main digital video signal and a standard ghost canceling reference component without an influence of reflected waves of each broadcasting signal or from a combination of said auxiliary analog video signal, said auxiliary digital video signal and said standard ghost canceling reference component, f-3) a selecting means having a first input port connected with said main receiving circuit and said main analog-to-digital converting circuit, a second input port connected with said auxiliary receiving circuit and said auxiliary analog-to-digital converting circuit and an output port connected with said coefficient producing means, and responsive to a shifting signal for selectively connecting said first input port and said second input port with said output port, f-4) a memory circuit for storing a plurality sets of weighted coefficients for said others of said broadcasting signals, each of said plurality sets of weighted coefficients being produced from said combination of said auxiliary analog video signal, said auxiliary digital video signal and said standard ghost canceling reference component, f-5) a transfer circuit having a first port for transferring said weighted coefficients produced from said combination of said auxiliary analog video signal, said auxiliary digital video signal and said standard ghost canceling reference component from said coefficient producing means to said memory circuit in said stable period, and a second port for continuously supplying said weighted coefficient signal indicative of said weighted coefficients produced from said combination of said main analog video signal, said main digital video signal and said standard ghost canceling reference component to said ghost component canceling means in said stable period, and f-6) a processor means responsive to said channel selecting signal for producing said shifting signal, said processor means being further operative to cause said channel controller to sequentially change said presently selected channel indicated by said auxiliary channel selecting signal in said stable period, said processor means being further operative to cause said transfer circuit to temporally supply one of said plurality sets of weighted coefficients read out from said memory circuit from said second port to said ghost component canceling means in said transition period after said main receiving circuit is tuned with another channel.

* * * * *